(12) United States Patent
Won et al.

(10) Patent No.: US 9,798,951 B2
(45) Date of Patent: Oct. 24, 2017

(54) APPARATUS, METHOD, AND PROCESSOR FOR MEASURING CHANGE IN DISTANCE BETWEEN A CAMERA AND AN OBJECT

(71) Applicants: SAMSUNG ELECTRONICS CO., LTD., Suwon-si, Gyeonggi-do (KR); KOREA UNIVERSITY RESEARCH AND BUSINESS FOUNDATION, Seoul (KR)

(72) Inventors: Jong-hoon Won, Suwon-si (KR); Kazuhiko Sugimoto, Seongnam-si (KR); Masataka Hamada, Suwon-si (KR); Chang-su Kim, Seoul (KR); Yeong-jun Koh, Seoul (KR); Dae-youn Lee, Gwangmyeong-si (KR); Chul Lee, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 233 days.

(21) Appl. No.: 14/513,819

(22) Filed: Oct. 14, 2014

(65) Prior Publication Data
US 2015/0103163 A1 Apr. 16, 2015

(30) Foreign Application Priority Data
Oct. 14, 2013 (KR) ........................ 10-2013-0122215

(51) Int. Cl.
*H04N 7/18* (2006.01)
*G06K 9/62* (2006.01)
(Continued)

(52) U.S. Cl.
CPC ............ *G06K 9/6201* (2013.01); *G06T 7/194* (2017.01); *G06T 7/254* (2017.01); *G06T 7/269* (2017.01);
(Continued)

(58) Field of Classification Search
CPC .... G01B 11/14; G06K 9/6201; G06K 9/4604; G06T 7/0071; G06T 2207/20144
See application file for complete search history.

(56) References Cited

U.S. PATENT DOCUMENTS 7,283,668 B2 10/2007 Moon et al.
7,860,386 B2 12/2010 Terashima
(Continued)

FOREIGN PATENT DOCUMENTS

| JP | 2012-014558 A | 1/2012 |
| KR | 2003-0060328 A | 7/2003 |
| KR | 2007-0118036 A | 12/2007 |

OTHER PUBLICATIONS

Horn et al., "Determining Optical Flow", A.I. Memo No. 572, Apr. 1980, pp. 1-27, Massachusetts Institute of Technology Artificial Intelligence Laboratory.
(Continued)

*Primary Examiner* — Sath V Perungavoor
*Assistant Examiner* — Peet Dhillon
(74) *Attorney, Agent, or Firm* — Drinker Biddle & Reath LLP

(57) ABSTRACT

Provided is an apparatus for measuring a distance change, the apparatus including an information acquisition unit, an object determination unit, a feature point determination unit, an optical flow calculator, a matching point determination unit, an object length change calculator that calculates a length change ratio between an object of a first frame image and an object of a second frame image by using a feature
(Continued)

point and a matching point, and a distance change calculator that calculates a change from a distance between a camera and the object from when the camera acquires the first frame image and when the camera acquires the second frame image using the calculated length change ratio.

18 Claims, 11 Drawing Sheets

(51) Int. Cl.
*G06T 7/579* (2017.01)
*G06T 7/254* (2017.01)
*G06T 7/269* (2017.01)
*G06T 7/194* (2017.01)

(52) U.S. Cl.
CPC .... *G06T 7/579* (2017.01); *G06T 2207/10024* (2013.01); *G06T 2207/20016* (2013.01); *G06T 2207/20021* (2013.01); *G06T 2207/20076* (2013.01)

(56) References Cited

U.S. PATENT DOCUMENTS

| | | |
|---|---|---|
| 2005/0285967 A1 | 12/2005 | Suda |
| 2008/0031611 A1 | 2/2008 | Konishi |
| 2010/0034428 A1* | 2/2010 | Fukunishi .............. G06T 7/223 382/107 |
| 2010/0086206 A1* | 4/2010 | Hong .................. G06T 7/0002 382/168 |
| 2010/0194971 A1 | 8/2010 | Li et al. |
| 2013/0121577 A1* | 5/2013 | Wang ...................... G06T 7/20 382/173 |
| 2014/0003741 A1* | 1/2014 | Cui ....................... G06T 7/0024 382/298 |

OTHER PUBLICATIONS

Harris et al., "A Combined Corner and Edge Detector", in Proc. Alvey Vision Conf., 1988, 5 pages.
Shi et al., "Good Features to Track", in Proc. CVPR, 1994, pp. 593-600.
Comaniciu et al., "Kernel-Based Object Tracking", IEEE Trans. Pattern Anal. Mach. Intell., May 2003, 25(5):564-577.
Bruhn et al., "Lucas/Kanade Meets Horn/Schunck: Combining Local and Global Optic Flow Methods", Int'l J. Computer Vision, 2005, 61(3):211-231.
Özuysal et al., "Fast Keypoint Recognition Using Random Ferns", IEEE Trans. Pattern Anal. Mach. Intell., Mar. 2010, 32(3):448-461.
Leichter, "Mean Shift Trackers with Cross-Bin Metrics", IEEE Trans. Pattern Anal. Mach. Intell., Apr. 2012, 34(4):695-706.

* cited by examiner

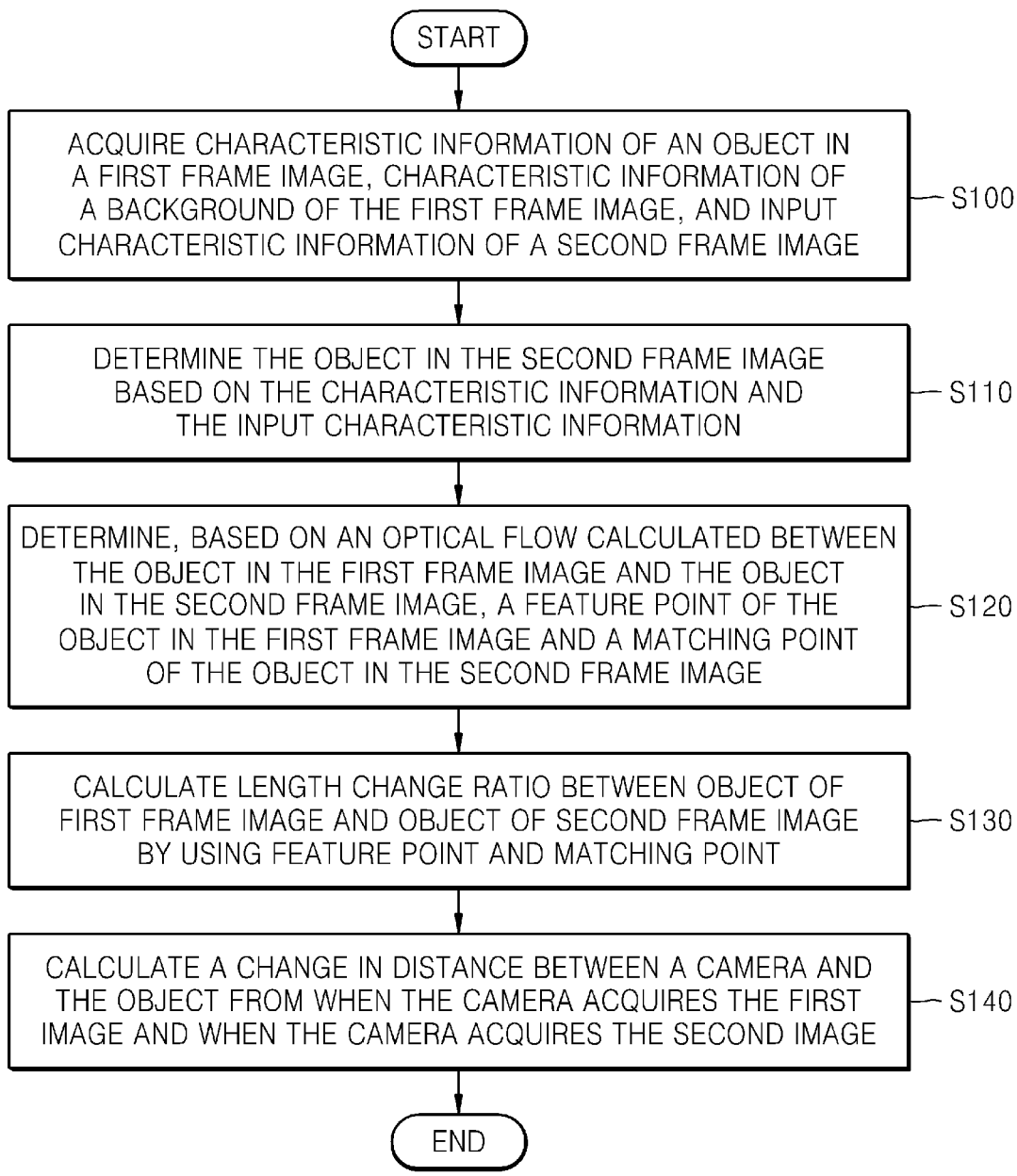

FIG. 3A
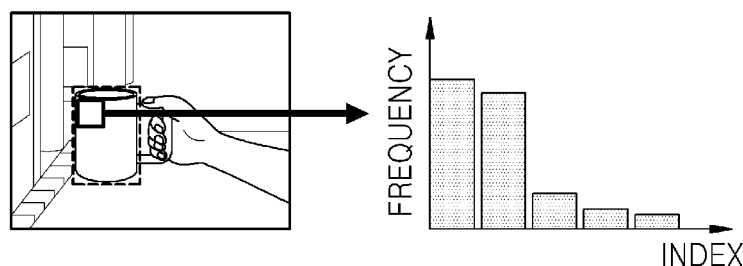
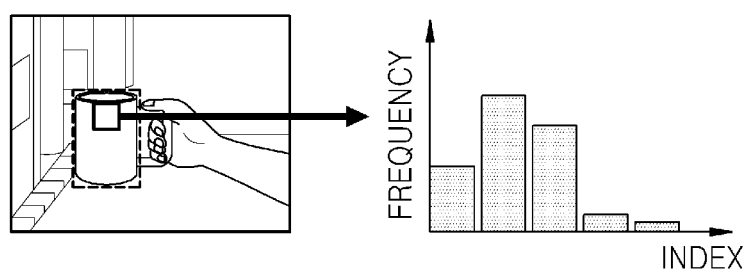
FIG. 3B
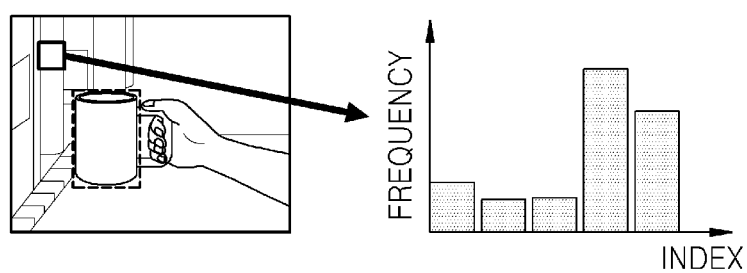
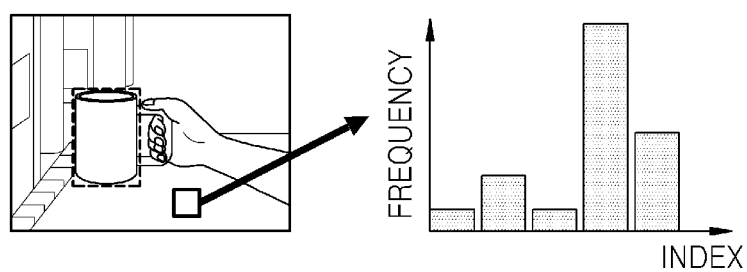

APPARATUS, METHOD, AND PROCESSOR FOR MEASURING CHANGE IN DISTANCE BETWEEN A CAMERA AND AN OBJECT

CROSS-REFERENCE TO RELATED APPLICATIONS

This application claims the priority benefit of Korean Patent Application No. 10-2013-0122215, filed on Oct. 14, 2013 in the Korean Intellectual Property Office, the disclosure of which is incorporated herein in its entirety by reference.

BACKGROUND

1. Field

One or more embodiments of the present disclosure relate to an apparatus, method, and processor for measuring a change in distance between a camera and an object by using object tracking.

2. Description of the Related Art

Mirrorless cameras that use contrast auto-focusing (AF) often require continuous AF. Such continuous AF may include analyzing a motion of an object, estimating its future position, and adjusting and focusing a lens accordingly in advance.

SUMMARY

One or more embodiments of the disclosure include a method of calculating a change in length of an object in consecutive frames by using matching points of the object in the respective consecutive frames, and estimating a change in distance between a camera and the object by using the change in length of the object.

Additional aspects will be set forth in part in the description that follows and, in part, will be apparent from the description, or through practice of the disclosed embodiments.

According to one or more embodiments of the disclosure, a method of measuring a distance change includes: acquiring characteristic information of an object in a first frame image, characteristic information of a background of the first frame image, and input characteristic information of a second frame image; determining the object in the second frame image based on the acquired characteristic information and input characteristic information; determining, based on an optical flow calculated between the object in the first frame image and the object in the second frame image, a feature point of the object in the first frame image and a matching point of the object in the second frame image, wherein the matching point corresponds to the feature point; calculating a length change ratio between the object in the first frame image and the object in the second frame image by using the feature point and the matching point; and using the length change ratio to calculate a change of distance between a camera acquiring the first and second frame images and the object.

According to one or more embodiments of the disclosure, an apparatus for measuring a distance change includes: an information acquisition unit that acquires characteristic information of an object in a first frame image, characteristic information of a background of the first frame image, and input characteristic information of a second frame image; an object determination unit that determines the object in the second frame image based on the acquired characteristic information and input characteristic information; a feature point determination unit that determines a feature point of the object in the first frame image; an optical flow calculator that calculates optical flow between the object in the first frame image and the object in the second frame image; a matching point determination unit that determines a matching point of the object in the second frame image based on the calculated optical flow, wherein the matching point corresponds to the feature point; an object length change calculator that calculates a length change ratio between the object in the first frame image and the object in the second frame image by using the feature point and the matching point; and a distance change calculator that uses the calculated length change ratio to calculate a change from a distance between a camera acquiring the first and second frame images and the object.

According to one or more embodiments of the disclosure, a processor executes instructions of a computer program to perform a distance change measuring method. In doing so, the processor carries out steps including: acquiring characteristic information of an object in a first frame image, characteristic information of a background of the first frame image, and input characteristic information of a second frame image; determining the object in the second frame image based on the acquired characteristic information and input characteristic information; based on optical flow calculated between the object in the first frame image and the object in the second frame image, determining a feature point of the object in the first frame image and a matching point of the object in the second frame image, wherein the matching point corresponds to the feature point; calculating a length change ratio between the object in the first frame image and the object in the second frame image by using the feature point and the matching point; and using the length change ratio to calculate a change of distance between a camera acquiring the first and second frame images and the object.

BRIEF DESCRIPTION OF THE DRAWINGS

These and/or other aspects will become apparent and more readily appreciated from the following description of the embodiments, taken in conjunction with the accompanying drawings in which:

FIG. 2 is a flowchart of a distance change measuring method of measuring a change in distance between a camera and an object, according to an embodiment;

FIG. 3A and FIG. 3B show examples of a color histogram characteristic for a distance change measuring apparatus according to an embodiment to acquire color information regarding an object and color information regarding a background from a first frame image;

DETAILED DESCRIPTION

Figure 1:
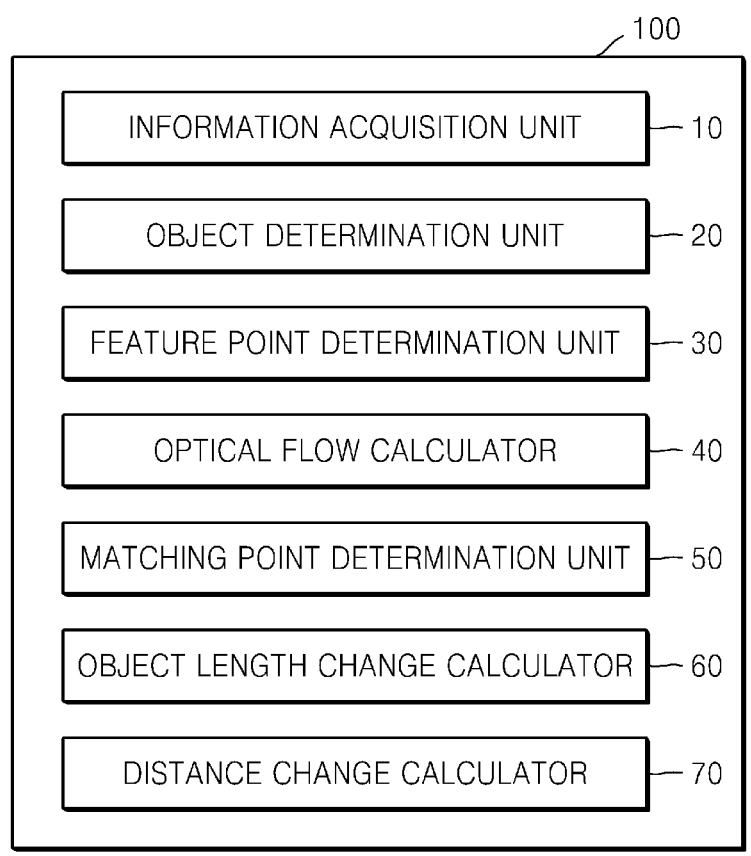
FIG. 1 is a block diagram of a distance change measuring apparatus for measuring a change in distance between a camera and an object, according to an embodiment.

Reference will now be made in detail to embodiments, examples of which are illustrated in the accompanying drawings, wherein like reference numerals refer to like elements throughout. In the description with reference to the drawings, like reference numerals in the drawings denote like elements, and repetitive descriptions thereof will be omitted. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Although terms, such as "first" and "second", may be used to describe various elements, the elements are not limited by these terms. These terms are only used to differentiate one element from another element.

The present disclosure allows various kinds of modification and can have many embodiments, and particular embodiments are illustrated in the drawings and described in detail herein. However, it is to be understood that the particular embodiments do not limit the present disclosure to a particular embodiment but include every modified, equivalent, or replaced one within the spirit and technical cope of the present disclosure. As used herein, the term "and/or" includes any and all combinations of one or more of the associated listed items.

The terminology used in this application is used to describe particular embodiments and does not limit the present disclosure. An expression in the singular includes an expression in the plural unless they are clearly different from each other in context. In this application, terms, such as "include" and "have", are used to indicate the existence of features, numbers, steps, operations, elements, parts, or combinations thereof mentioned herein without excluding in advance the possibility of existence or addition of one or more other features, numbers, steps, operations, elements, parts, or combinations thereof.

FIG. 1 is a block diagram of a distance change measuring apparatus 100 that measures a change in distance between a camera and an object, according to an embodiment.

The distance change measuring apparatus 100 may include an information acquisition unit 10, an object determination unit 20, a feature point determination unit 30, an optical flow calculator 40, a matching point determination unit 50, an object length change calculator 60, and a distance change calculator 70.

The information acquisition unit 10 according to an embodiment acquires characteristic information of an object and characteristic information of a background of a first frame image, and input characteristic information of a second frame image.

For example, the characteristic information of the object and the characteristic information of the background of the first frame image may include color information and outline information.

This will be described in detail with reference to FIG. 3A to FIG. 5B.

The object determination unit 20 according to an embodiment may determine the object in the second frame image based on the characteristic information and the input characteristic information acquired by the information acquisition unit 10.

This will be described in detail with reference to FIG. 6A to FIG. 6D.

The feature point determination unit 30 according to an embodiment may determine a feature point of the object in the first frame image.

The feature point according to an embodiment may be determined through edge detection based on texture elements of the first frame image.

This will be described in detail with reference to FIG. 8.

The optical flow calculator 40 according to an embodiment may calculate optical flow between the object in the first frame image and the object in the second frame image.

Optical flow according to an embodiment is information indicating a motion between the first frame image and the second frame image, and may be presented as, for example, a motion vector of a pixel in each frame image.

This will be described in detail with reference to FIG. 7.

The matching point determination unit 50 according to an embodiment may determine a matching point corresponding to a feature point of the object in the second frame image based on the optical flow calculated by the optical flow calculator 40.

The object length change calculator 60 according to an embodiment may calculate a length change ratio between the object in the first frame image and the object in the second frame image by using the feature point determined by the feature point determination unit 30 and the matching point determined by the matching point determination unit 50.

This will be described in detail with reference to FIG. 10A to FIG. 10C.

The distance change calculator 70 according to an embodiment may calculate a change in a distance between a camera and the object from when the camera acquires the first frame image and when the camera acquires the second frame image by using the length change ratio calculated by the object length change calculator 60.

This will be described in detail with reference to FIG. 11.

Operations of the distance change measuring apparatus 100 will be sequentially described in detail.

FIG. 2 is a flowchart of a distance change measuring method of measuring a change in distance between a camera and an object, according to an embodiment.

In step 100, the distance change measuring apparatus 100 ACQUIRES CHARACTERISTIC INFORMATION OF AN OBJECT IN A FIRST FRAME IMAGE, CHARACTERISTIC INFORMATION OF A BACKGROUND OF THE FIRST FRAME IMAGE, AND INPUT CHARACTERISTIC INFORMATION OF A SECOND FRAME IMAGE.

For example, an object window may be set based on the object in the first frame image, and the characteristic information of the object and the characteristic information of the background of the first frame image may be calculated based on a position and a size of the set object window.

In addition, a search window may be set in the second frame image based on the object window shown in the first frame image, and input characteristic information of each pixel of the second frame image may be acquired based on a position and a size of the set search window.

This will be described in detail with reference to FIG. 3A to FIG. 5B.

In step 110, the distance change measuring apparatus 100 DETERMINES THE OBJECT IN THE SECOND FRAME IMAGE BASED ON THE CHARACTERISTIC INFORMATION AND THE INPUT CHARACTERISTIC INFORMATION acquired in step 100.

For example, based on the position of the object window of a first frame and the acquired characteristic information and input characteristic information, an object window of the second frame image may be set.

This will be described in detail with reference to FIG. 6A to FIG. 6D.

In step 120, the distance change measuring apparatus 100 determines a feature point of the object in the first frame image, and determines a matching point corresponding to a feature point of the object in the second frame image based on optical flow calculated between the object in the first frame image and the object in the second frame image that is determined in step 110.

For example, based on texture elements of the first frame image, a plurality of feature points may be determined in the first frame image. This will be described in detail with reference to FIG. 8.

In addition, using contrast and saturation of the first frame image and the second frame image, a blur region may be detected in the first frame image and in the second frame image. In this case, the optical flow may be calculated as a motion vector of a pixel between the first frame image and the second frame image excluding the detected blur region.

This will be described in detail with reference to FIG. 7.

Furthermore, at least two points may be selected from among the plurality of determined feature points, and at least two matching points corresponding to the at least two selected points may be determined based on the calculated optical flow.

This will be described in detail with reference to FIG. 10A to FIG. 10C.

In step 130, the distance change measuring apparatus 100 calculates a length change ratio between the object in the first frame image and the object in the second frame image by using the feature points and the matching points determined in step 120.

This will be described in detail with reference to FIG. 10A to FIG. 10C.

In step 140, the distance change measuring apparatus 100 calculate a change in a distance between a camera and the object from when the camera acquires the first frame image and when the camera acquires the second frame image by using the length change ratio calculated in step 130.

This will be described in detail with reference to FIG. 11.

FIG. 3A and FIG. 3B show examples of a color histogram characteristic for a distance change measuring apparatus according to an embodiment to acquire color information of an object and a background from a first frame image.

To acquire color information according to an embodiment, a color histogram characteristic of a block included in a frame image may be used.

For example, the color histogram characteristic may be determined using a hue, saturation, and value (HSV) color model.

When color channel information of an $i^{th}$ pixel of a block k having a size of 6×6 is $x=(h_i, s_i, v_i)$, a value of a histogram index u may be determined as shown below. In this case, C is a normalization constant, and each piece of color channel information may be converted into a number between about 0 and about 15 by using a quantization function b:

$$q_u = \begin{cases} C \sum_{i \in B_k} \delta(b(h_i) - u) & \text{if } u < 16 \\ C \sum_{i \in B_k} \delta(b(s_i) - (u - 16)) & \text{if } 16 \leq u < 32 \\ C \sum_{i \in B_k} \delta(b(v_i) - (u - 32)) & \text{if } 32 \leq u \end{cases}$$

Also, using a low pass filter, the value of the histogram index u may be determined as shown below. In this case, $C_h$, $C_s$, $C_v$ may be normalization constants for respective color channels:

$$\tilde{q}_u = \begin{cases} C_k \sum_{i \in B_k} (2\delta(b(h_i) - u) + \delta(b(h_i) - \\ \qquad u + 1) + \delta(b(h_i) - u - 1)) & \text{if } u < 16 \\ C_s \sum_{i \in B_k} (2\delta(b(s_i) - (u - 16)) + \delta(b(s_i) - \\ \qquad (u - 15)) + \delta(b(s_i) - (u - 17))) & \text{if } 16 \leq u < 32 \\ C_v \sum_{i \in B_k} (2\delta(b(v_i) - (u - 32)) + \delta(b(v_i) - \\ \qquad (u - 31)) + \delta(b(v_i) - (u - 33))) & \text{if } 32 \leq u \end{cases}$$

As shown in FIG. 3A, a block having a size of 6×6 may be generated inside an object window shown in a first frame image, and a color histogram characteristic of the object may be determined in the generated block.

As shown in FIG. 3B, a block having a size of 6×6 may be generated outside an object window shown in the first frame image, and a color histogram characteristic of a background may be determined in the generated block. For example, the block having the size of 6×6 may be generated at a random position outside the object window.

Figure 4A:
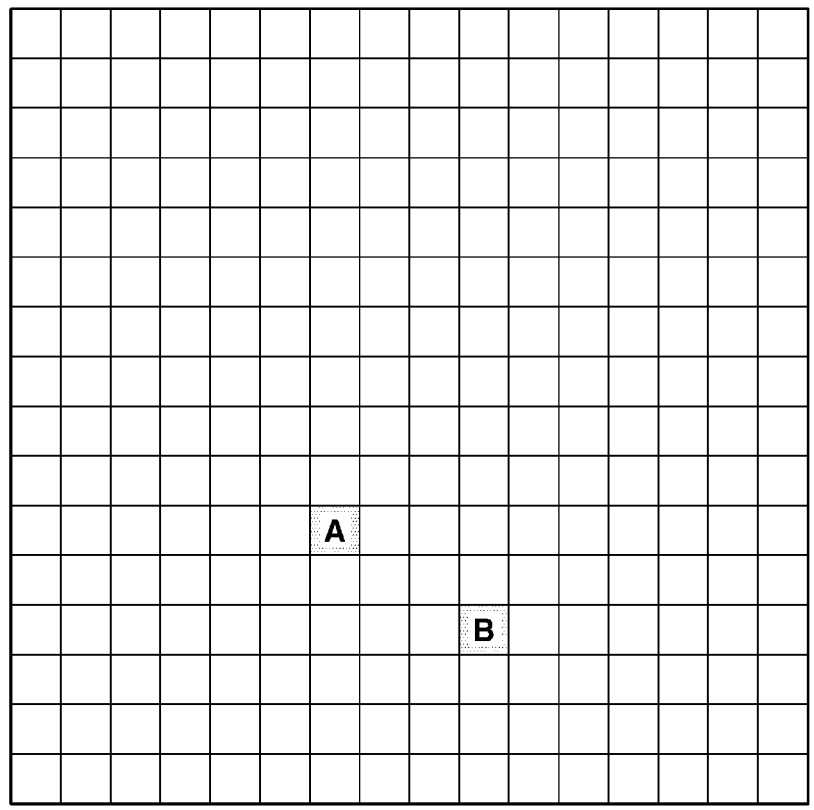
FIG. 4A and FIG. 4B show an example of a block difference characteristic for a distance change measuring apparatus according to an embodiment to acquire outline information of an object and outline information of a background from a first frame image.
Figure 4B:
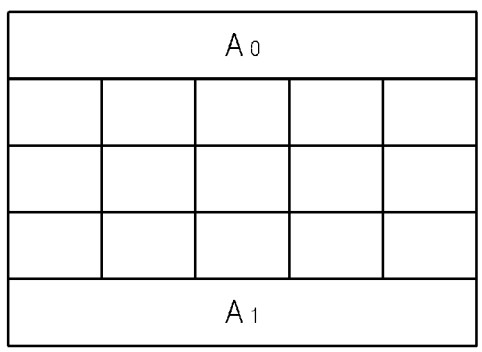

FIG. 4A and FIG. 4B show an example of a block difference characteristic for a distance change measuring apparatus according to an embodiment to acquire outline information of an object and a background from a first frame image.

To acquire outline information according to an embodiment, a block difference characteristic of blocks included in a frame image may be used.

As shown in FIG. 4A, an object window shown in a first frame image may be divided into 16×16 blocks, and block A and block B may be randomly selected from among the resultant blocks.

For example, a block difference characteristic between block A and block B may be a difference between a block value of block A and that of block B.

Also, a Y-direction gradient value in each block may be used as a block value. For example, the inside of block A shown in FIG. 4A may be divided as shown in FIG. 4B. In this case, a difference value in average brightness between $A_0$ region and $A_1$ region of block A may be used as the value of block A.

Furthermore, a difference between values of the two blocks selected from the object window shown in the first frame image may be set as a one dimensional value of a block difference characteristic.

In other words, a plurality of blocks having a predetermined size may be generated inside the object window shown in the first frame image, and it is possible to determine a block difference characteristic of an object that may have a difference in block value between two blocks selected from among the plurality of generated blocks as one dimensional value.

Likewise, a plurality of blocks having a predetermined size may be generated outside the object window shown in the first frame image, and it is possible to determine a block difference characteristic of a background that may have a difference in block value between two blocks selected from among the plurality of generated blocks as one dimensional value. For example, the block having the predetermined size may be generated at a random position outside the object window.

Figure 5A:
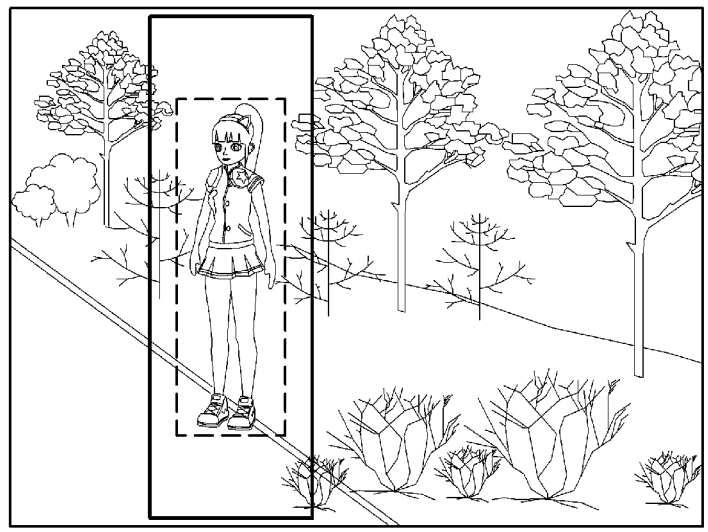
FIG. 5A and FIG. 5B show an example in which a distance change measuring apparatus according to an embodiment sets a search window to acquire input characteristic information from a second frame image.
Figure 5B:
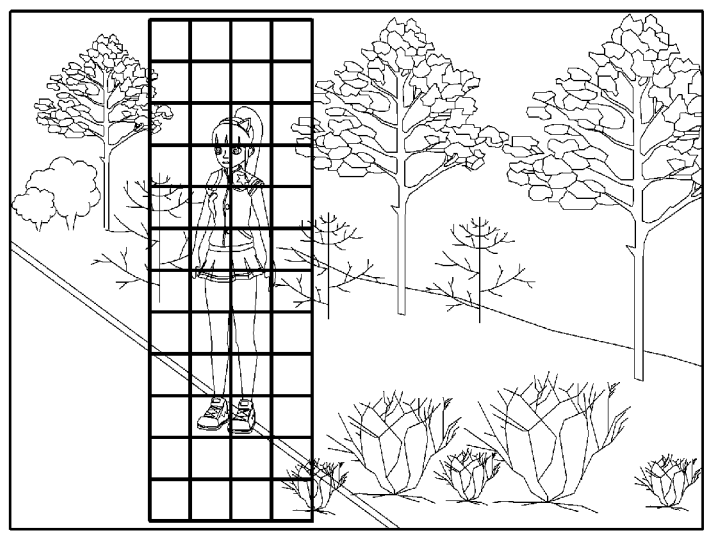

FIG. 5A and FIG. 5B show an example in which a distance change measuring apparatus according to an embodiment sets a search window to acquire input characteristic information from a second frame image.

To acquire input characteristic information according to an embodiment, a color histogram characteristic and a block difference characteristic of blocks included in a frame image may be used.

According to an embodiment, based on an object window shown in a first frame, a search window may be set in a second frame.

For example, as shown in FIG. 5A, a window having twice the size of the object window and centered on the object window shown in the first frame may be set as a search window in the second frame.

Also, as shown in FIG. 5B, a plurality of blocks having a predetermined size may be generated inside the search window shown in the second frame, and a color histogram characteristic may be determined as an input characteristic in the generated blocks.

Furthermore, as shown in FIG. 5B, a plurality of blocks having a predetermined size may be generated inside the search window shown in the second frame, and a block difference characteristic that may have a difference in block value between two blocks selected from among the plurality of generated blocks as one dimensional value may be determined as an input characteristic.

FIG. 6A to FIG. 6D show an example in which a distance change measuring apparatus according to an embodiment generates a probability map using characteristic information of an object of a first frame image, characteristic information of a background of the first frame image, and input characteristic information of a second frame image, and determines a position of an object in a second frame image.

Characteristic information of an object in a first frame image according to an embodiment may be presented as a color histogram characteristic and a block difference characteristic of the object. Also, characteristic information of a background in the first frame image according to an embodiment may be presented as a color histogram characteristic and a block difference characteristic of the background.

Input characteristic information of a second frame image according to an embodiment may be determined for each pixel of the second frame image.

A probability map according to an embodiment may be generated using a $K^{th}$ nearest neighbor.

For example, when a distance between input characteristic information of an $i^{th}$ pixel and the closest background characteristic information in the second frame image is $r_{i,0}^b$, and a distance between the input characteristic information of the $i^{th}$ pixel and the second closest background characteristic information in the second frame image is $r_{i,1}^b$, a distance $\bar{r}_i^b$ from a background is the average of the distances, which is given as follows:

$$\bar{r}_i^b = \frac{r_{i,0}^b + r_{i,1}^b}{2}.$$

Also, a distance $\bar{r}_i^f$ from an object may be calculated through the same process:

$$\bar{r}_i^f = \frac{r_{i,0}^f + r_{i,1}^f}{2}$$

Therefore, a probability of the $i^{th}$ piece of input characteristic information being an object in the second frame image is as follows:

$$p_i^f = \left(\frac{\bar{r}_i^f}{\bar{r}_i^b + \bar{r}_i^f}\right)^2$$

Based on input characteristic information of each pixel of the second frame image, a probability value of the pixel is determined, and a probability map is generated by multiplying probability values of color histogram characteristics and probability values of block difference characteristics.

For example, a position of an object window generated for the $n^{th}$ time in the second frame image may be calculated as the sum of weights using a position of a pixel $(x_k, y_k)$ in an object window generated for the $n-1^{th}$ time and a probability value $p_k^f$ of the pixel as follows:

$$(\hat{x}_n, \hat{y}_n) = \frac{1}{P} \sum_{k \in W_{n-1}} p_k^f \times (x_k, y_k).$$

Figure 6A:
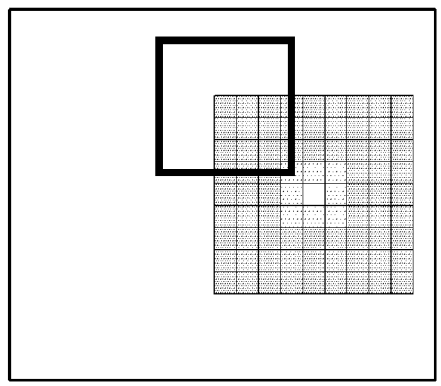
FIG. 6A to FIG. 6D show an example in which a distance change measuring apparatus according to an embodiment generates a probability map using characteristic information of an object of a first frame image, characteristic information of a background of the first frame image, and input characteristic information of a second frame image, and determines a position of an object in a second frame image.

As shown in FIG. 6A, to determine a position of an object window in the second frame image by using the probability map, generation of the object window may be started at a position of an object window in the first frame image.

Figure 6B:
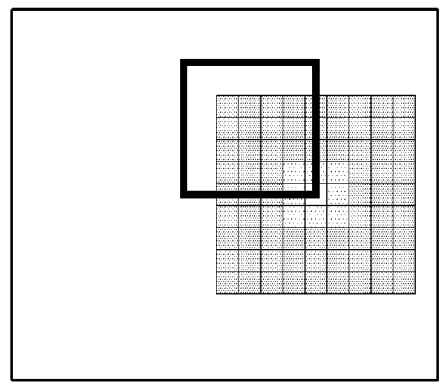
Figure 6C:
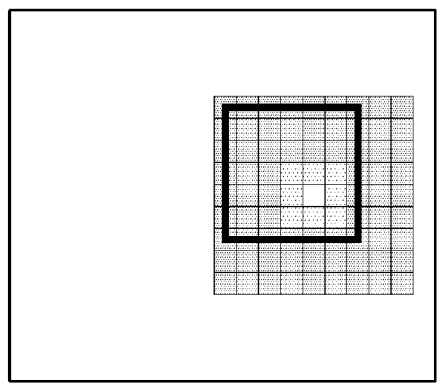
Figure 6D:
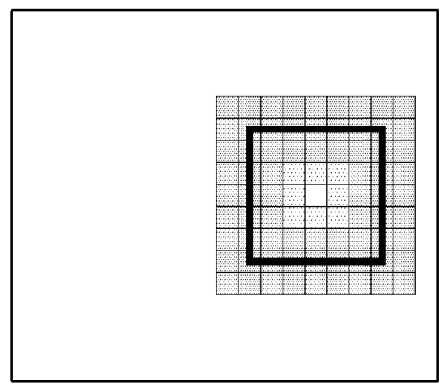

Also, by calculating the sum of weights of positions and probability values of pixels in a search window shown in the second frame image, an object window in the second frame image may be generated in sequence as shown in FIG. 6B to FIG. 6D so that the sum increases.

Figure 7:
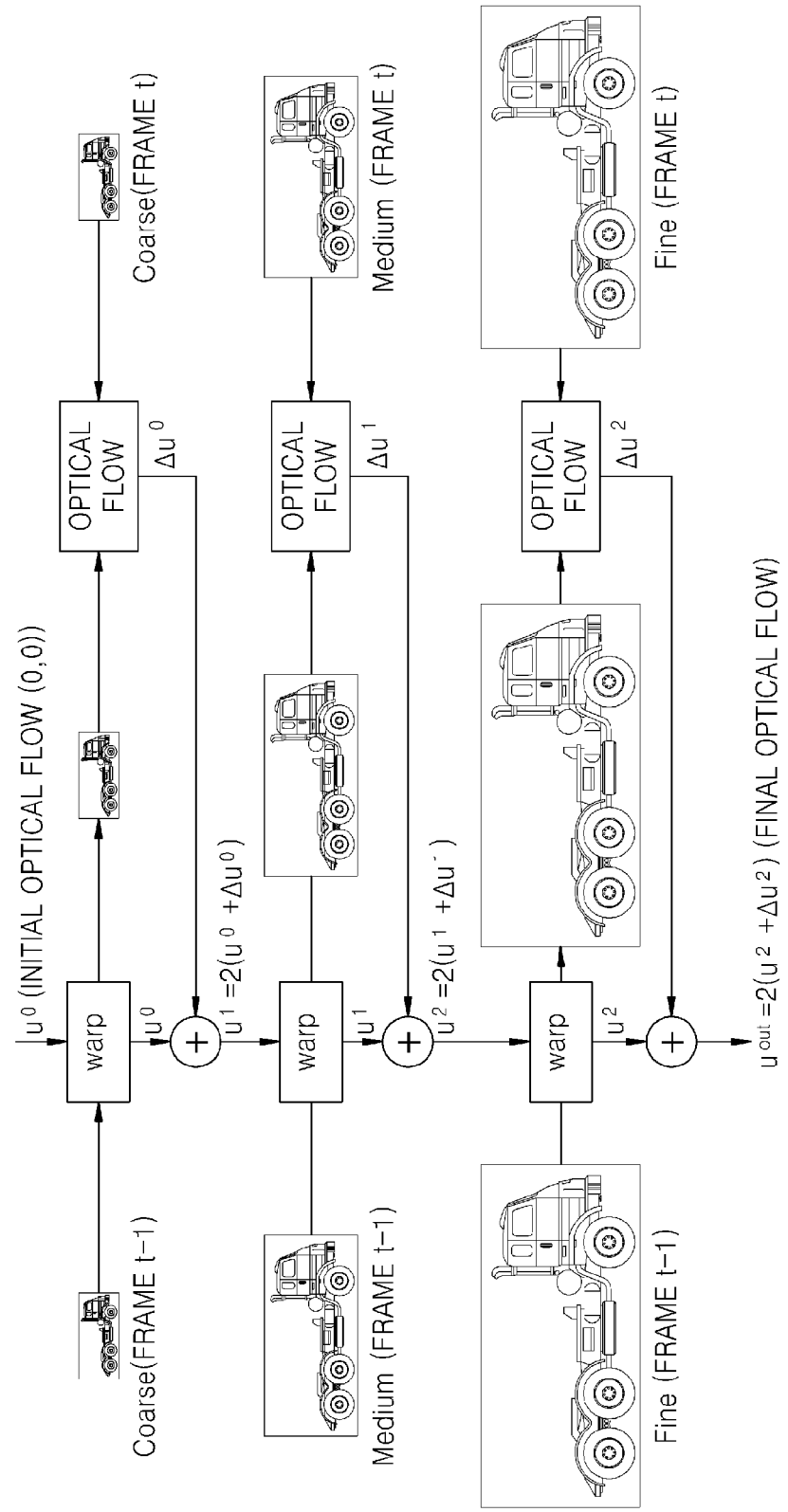
FIG. 7 is a conceptual diagram in which a distance change measuring apparatus according to an embodiment calculates optical flow from frame images by using a pyramid-based hierarchical method.

FIG. 7 is a conceptual diagram in which a distance change measuring apparatus according to an embodiment calculates optical flow from frame images by using a pyramid-based hierarchical method.

Optical flow according to an embodiment is information indicating a motion between a first frame image and a second frame image, and may be presented as, for example, a motion vector of a pixel in each frame image.

In this case, using the optical flow, an object in the first frame image may be matched to an object in the second frame image.

For example, pixels having the same brightness in the first frame image and the second frame image may be matched to each other. Also, when horizontal optical flow of each pixel is u, and vertical optical flow is v, a brightness constancy equation may be defined as shown below. Here, $I_x$, $I_y$, $I_t$ denote horizontal, vertical, and time direction gradients, respectively:

$$I_x u + I_y v + I_t = 0$$

According to an embodiment, the horizontal and vertical optical flow u and v may be calculated for each pixel using the above equation.

However, in a region of a frame image lack of texture, there are many positions having similar brightness values, and thus an error may occur in the calculation of optical flow.

Therefore, according to an embodiment, optical flow of each pixel may be corrected using optical flow of surrounding pixels of the pixel.

For example, when the average optical flow of pixels in a block set to be centered on one pixel is (u,v), in order to minimize a difference between optical flow of the center pixel and the average optical flow, the optical flow (u,v) minimizing a value of E may be calculated as follows:

$$E = \int\int (I_x u + I_y v + I_t)^2 + a(|\bar{u} - u|^2 + |\bar{v} - v|^2) dx dy$$

$$u = \bar{u} - \frac{I_x(I_x \bar{u} + I_y \bar{v} + I_t)}{(I_x^2 + I_y^2 + a)}, \quad v = \bar{v} - \frac{I_y(I_x \bar{u} + I_y \bar{v} + I_t)}{(I_x^2 + I_y^2 + a)}.$$

In the calculation of optical flow according to an embodiment, a pyramid-based hierarchical optical flow calculation method may be used.

For example, as shown in FIG. 7, each of the first frame image and the second frame image may be converted into about half the size of the original image and about a quarter the size of the original image. In this case, optical flow may be sequentially calculated beginning with the frame images converted into about a quarter the size of the original images to the frame images of the original size.

More specifically, a warping image may be generated by warping optical flow $u^1$ of the frame image converted into about a quarter the size of the original image and the first frame image converted into about half the size of the original image. Also, optical flow $\Delta u^2$ may be calculated between the generated warping image and the second frame image converted into about half the size of the original image. In this case, using the optical flow $u^1$ and $\Delta u^2$, more accurate optical flow $u^2$ may be calculated.

Figure 8:
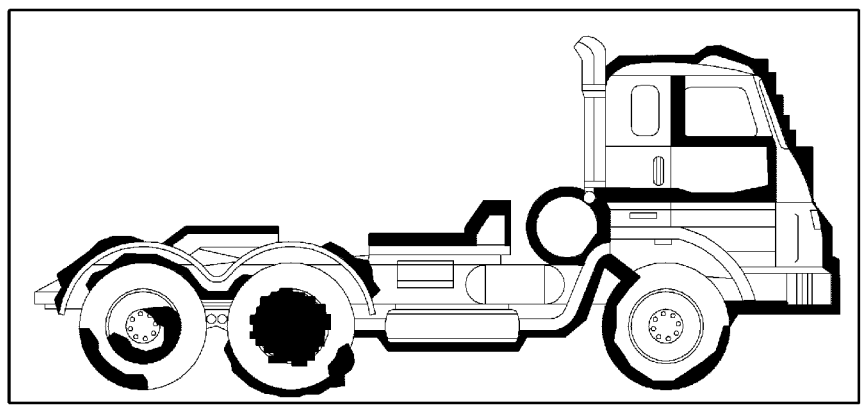
FIG. 8 is an image of an example in which a distance change measuring apparatus according to an embodiment determines feature points in a first frame image.

FIG. 8 shows an example in which a distance change measuring apparatus according to an embodiment determines feature points in a first frame image.

A feature point according to an embodiment may be determined through edge detection based on texture elements of a first frame image.

For example, using horizontal and vertical gradient values of pixels other than each pixel present in an n×n block centered on the pixel, a Harris matrix may be calculated.

$$G = \begin{bmatrix} \sum_{n \times n} I_x^2 & \sum_{n \times n} I_x I_y \\ \sum_{n \times n} I_x I_y & \sum_{n \times n} I_y^2 \end{bmatrix}$$

A pixel whose Harris matrix has two eigenvalues $\lambda_1$ and $\lambda_2$ satisfying an equation below may be determined as a feature point.

$$\min(\lambda_1, 10\lambda_2) > critical_{point}, (\lambda_1 > \lambda_2)$$

FIG. 8 is an image of an example in which a distance change measuring apparatus determines pixels satisfying the above equation as feature points, and the pixels determined as the feature points are shown in green.

Figure 9A:
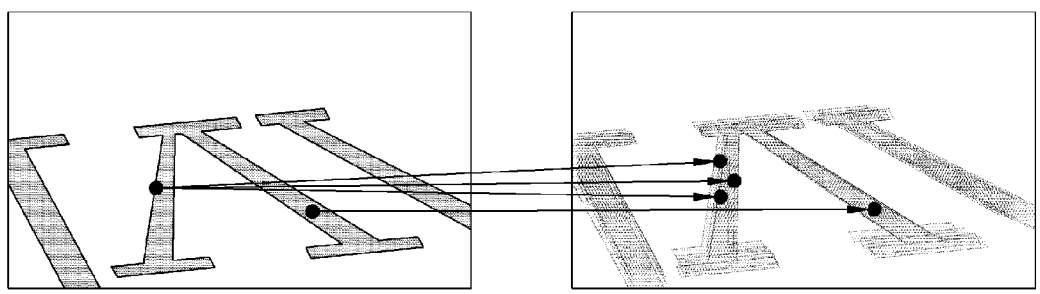
FIG. 9A and FIG. 9B show an example in which a distance change measuring apparatus according to an embodiment detects a blur region from each frame image.
Figure 9B:
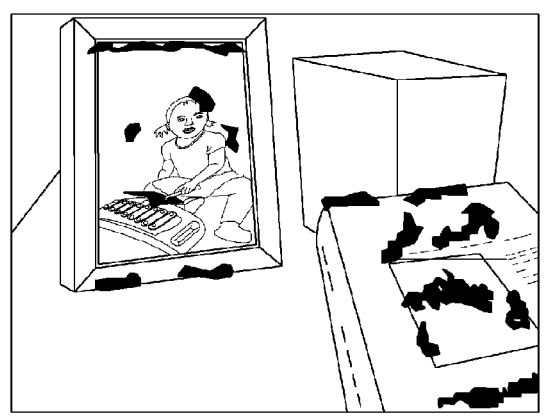

FIG. 9A and FIG. 9B show an example in which a distance change measuring apparatus according to an embodiment detects a blur region from each frame image.

In FIG. 9A described below, it is assumed that a first frame image is a slightly blurred image, and a second frame image is a severely blurred image.

As shown in FIG. 9A, when a yellow point is selected in the first frame image, the selected yellow point is matched to yellow matching points in a blur region of the second frame image by using optical flow, and the accuracy of matching may deteriorate.

On the other hand, when a red point is selected in the first frame image shown in FIG. 9A, a red matching point is present in a slightly blur region of the second frame image, and the accuracy of matching may be high.

Therefore, when a matching point is calculated using optical flow according to an embodiment, a matching point may be calculated using optical flow in a region of each frame other than a blur region.

In this case, each of the first frame image and the second frame image according to an embodiment may be divided into block units, and a blur region may be detected in each frame image by using contrast and saturation information of each block.

For example, a contrast value C of each block may be determined using a maximum value $L_{max}$ and a minimum value $L_{min}$ of luminance of pixels in the block:

$$C = \frac{L_{max} - L_{min}}{L_{max} + L_{min}}$$

Also, a saturation value S of each pixel may be determined using R, G, and B values of the pixel:

$$S = 1 - \frac{3}{(R+G+B)} \min(R, G, B)$$

In this case, a saturation value Sp of each block may be determined as a ratio of a maximum saturation $So_{max}$ of the frame image to a maximum saturation $Sb_{max}$ of the block:

$$Sp = \frac{Sb_{max}}{So_{max}}$$

Therefore, a blur measurement value B of each block may be determined as the product of a contrast value C of each block and a saturation value Sp of the block:

$B = C \times Sp$

For example, a block having a large difference between a blur measurement value $B_{sharp}$ of the block in the first frame image and a blur measurement value $B_{blur}$ of the block in the second frame image may be detected as a blur region in the respective frame images.

Also, $\rho_1$ and $\rho_2$ may be set to about 30 and 1.67, respectively, and a block satisfying an equation below may be detected as a blur region in the respective frames:

$$|B_{sharp} - B_{blur}| > \rho_1, \frac{B_{sharp}}{B_{blur}} > \rho_2$$

$\rho_1$ and $\rho_2$ may be set to about 30 and 1.67, respectively.

FIG. 9B is a diagram showing an example in which a distance change measuring apparatus detects a block satisfying the above equation as a blur region, and pixels detected as the blur region are shown in red.

According to an embodiment, using optical flow of a pixel that is not detected as a blur region in each frame image, a distance change between a camera and an object may be calculated.

Therefore, the distance change measuring method according to an embodiment may reduce the deterioration in the performance in measuring distance due to blur.

Figure 10A:
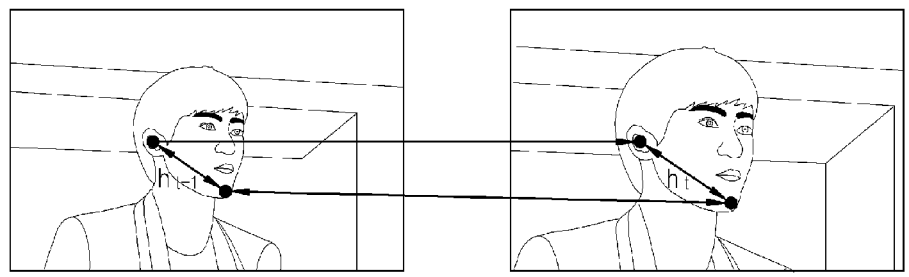
FIG. 10A to FIG. 10C are conceptual diagrams in which a distance change measuring apparatus according to an embodiment calculates a length change ratio between an object tracked in a first frame and the object tracked in a second frame.
Figure 10B:
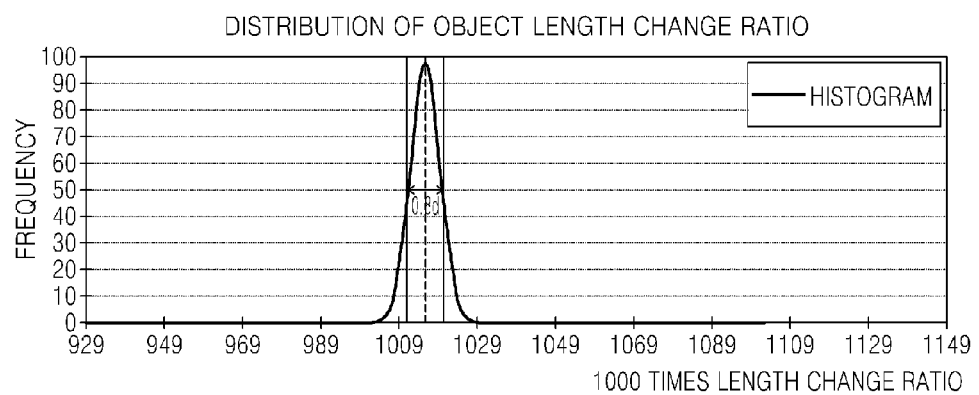
Figure 10C:
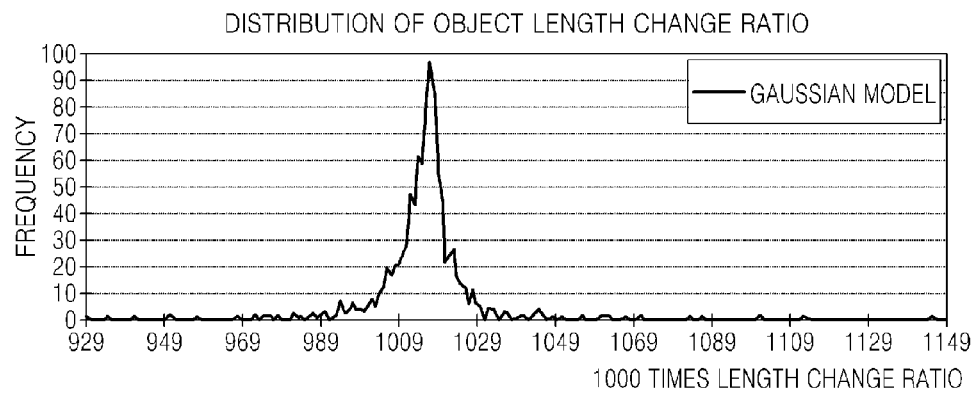

FIG. 10A to FIG. 10C are conceptual diagrams in which a distance change measuring apparatus according to an embodiment calculates a length change ratio between an object tracked in a first frame and the object tracked in a second frame.

As shown in FIG. 10A, two arbitrary points may be selected from among a plurality of feature points in a first frame, and matching points corresponding to the two arbitrary points of the first frame may be determined in a second frame by using optical flow-based matching.

For example, a length change ratio $\eta$ of an object may be calculated as a ratio of a distance $h_t$ between the two matching points of the second frame to a distance $h_{t-1}$ between the two points of the first frame:

$$r_i = \frac{h_t}{h_{t-1}}$$

However, since the two points of the first frame are randomly selected, the two points may not correspond to the object, or the performance in optical flow-based matching may deteriorate.

Therefore, a process of calculating the length change ratio $\eta$ of the object may be repeated a plurality of times, and a frequently obtained length change ratio may be determined as a distance change ratio $r_m$ between the object tracked in the first frame and the object tracked in the second frame.

For example, by repeating the process of selecting two random points in the first frame and calculating a length change ratio of the object 1000 times, a histogram, as shown in FIG. 10B, may be calculated.

As shown in FIG. 10B, the length change ratio $\eta$ of the object may be presented as a Gaussian distribution with an average $\mu$ and a standard deviation $\sigma$. Also, the length change ratio $\eta$ of the object may be modeled by a Gaussian function, as shown in FIG. 10C, using the average $\mu$ and the standard deviation $\sigma$.

For example, a set R may be determined to only include length change ratios $\eta$ satisfying a predetermined equation among 1000 length change ratios $\eta$ (i=0 ..., 1000) of the object:

$$R = \{\eta \,|\, |\eta - \mu| < 0.4\sigma\}$$

In this case, a median among the elements of the set R may be calculated as the distance change ratio $r_m$ between the object tracked in the first frame and the object tracked in the second frame.

$$r_m = \text{median}(R)$$

Figure 11:
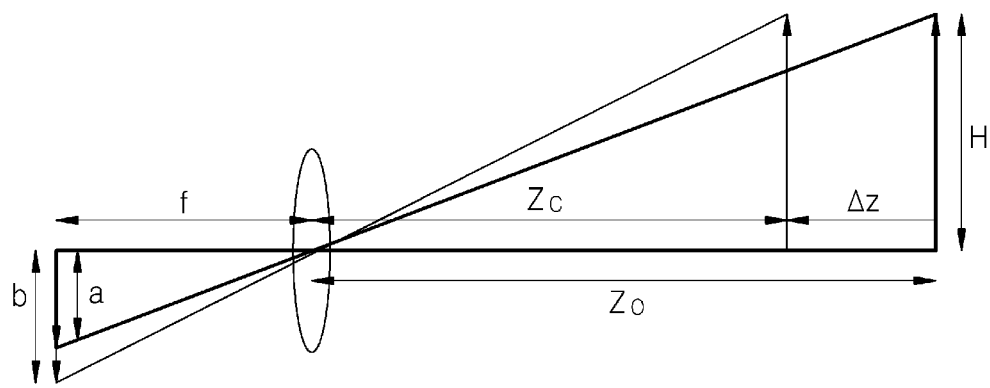
FIG. 11 is a conceptual diagram in which a distance change measuring apparatus according to an embodiment calculates a change in distance between a camera and an object.

FIG. 11 is a conceptual diagram in which a distance change measuring apparatus according to an embodiment calculates a change in distance between a camera and an object.

As shown in FIG. 11, assuming that a focal distance f of a camera is fixed, a change $\Delta z$ in distance between the camera and an object may be calculated using a distance change ratio $r_m$ between the object tracked in a first frame and the object tracked in a second frame.

As shown in FIG. 11, when a distance between the camera and the object is $Z_o$, the following proportional expression holds between an actual length H of the object and a length $\alpha$ of the object shown in an image of the camera:

$$f : Z_o = \alpha : H$$

Here, when the object moves by $\Delta z$, and a distance between the camera and the object becomes $Z_z$, the actual length H of the object does not vary, but a length b of the object shown in an image of the camera varies. Therefore, a new relational expression holds between the actual length H of the object and the length b of the object shown in the image of the camera:

$$f : Z_o - \Delta z = b : H$$

Based on the two proportional expressions, the change $\Delta z$ in distance between the camera and the object may be calculated:

$$fH = Z_o a = (Z_o - \Delta z)b$$

$$\Delta z = Z_o \left(1 - \frac{a}{b}\right)$$

In the above equation, $$\frac{a}{b}$$

corresponds to an inverse number of a length change ratio of the object shown in the images of the camera, and thus the change $\Delta z$ in distance between the camera and the object may be calculated by substituting the distance change ratio $r_m$ between the object tracked in the first frame and the object tracked in the second frame into the equation:

$$\Delta z = Z_o\left(1 - \frac{a}{b}\right) = Z_o\left(1 - \frac{1}{r_m}\right)$$

An apparatus according to various embodiments may include a processor, a memory for storing and executing program data, a permanent storage, such as a disk drive, a user interface device, such as a touch panel, keys, buttons, etc., and so on.

In addition, other embodiments of the disclosure can also be implemented through computer-readable code/instructions in/on a medium, e.g., a computer-readable medium, to control at least one processing element to implement any above-described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be such a defined and measurable structure including or carrying a signal or information, such as a device carrying a bitstream according to one or more embodiments of the disclosure. The media may also be a distributed network, so that the computer-readable code is stored/transferred and executed in a distributed fashion. Furthermore, the processing element could include a processor or a computer processor, and processing elements may be distributed and/or included in a single device.

Any references, including publications, patent applications, and patents, cited herein are hereby incorporated by reference to the same extent as if each reference were individually and specifically indicated to be incorporated by reference and were set forth in its entirety herein.

To aid in understanding of the disclosure, reference symbols have been used in the embodiments illustrated in the drawings, and particular terminology has been used to describe these embodiments. However, this particular terminology has no intention to limit the scope of the disclosure, and the disclosure should be construed to include all components that would normally occur to those of ordinary skill in the art.

Embodiments of the disclosure may be described in terms of functional blocks and various processing steps. Such functional blocks may be realized by any number of hardware and/or software components configured to perform particular functions. For example, the embodiments of the disclosure may employ various integrated circuit components, such as memory elements, processing elements, logic elements, loop-up tables, etc., that may carry out various functions under the control of one or more microprocessors or other control devices. Similarly, where the components of the embodiments may be implemented using software programming or software elements, the embodiments may be implemented with any programming or scripting language, such as C, C++, Java, assembler, etc., to include various algorithms implemented using any combination of data structures, processes, routines, or other programming elements. Functional aspects may be implemented as algorithms executed by one or more processors. Furthermore, the embodiments of the disclosure may employ related art for electronics configuration, signal processing, data processing, and/or so on. The terms, such as "mechanism," "element," and "configuration," may be used broadly and are not limited to mechanical and physical configurations. The terms may include a series of routines of software in conjunction with a processor and so on.

Particular implementations described in the disclosure are embodiments and are not intended to limit the scope of the disclosure in any way. For the sake of brevity, existing electronics, control systems, software development and other functional aspects of the systems may be omitted. Furthermore, the connecting lines, or connectors between components shown in the figures are intended to present exemplary functional connections and/or physical or circuit connections. In a practical apparatus, a variety of alternative or additional functional connections, physical connections, or circuit connections may be present. Moreover, a component may not be essential to the practice of the disclosure unless the element is specifically described as "essential" or "critical."

The use of the terms "a," "an," "the," and similar referents in this disclosure (especially in the claims) may be construed to cover both the singular and the plural. Furthermore, recitation of ranges of values herein are merely intended to serve as a shorthand method of referring individually to each separate value falling within the range (unless otherwise indicated herein), and each separate value is incorporated into the specification as if it were individually recited herein. Finally, the steps of a method described herein may be performed in any suitable order unless otherwise indicated herein or otherwise clearly contradicted by context. The disclosure is not limited to the described order of the steps. The use of any and all examples, or exemplary terms (e.g., such as) provided herein is intended merely to describe and does not pose a limitation on the scope of the disclosure unless otherwise claimed. Numerous modifications, combinations, and changes according to design conditions and factors will be apparent to those of ordinary skill in the art within the scope of the following claims or equivalents thereof.

What is claimed is:

1. On a processor, a method of measuring a distance change, the method comprising:
    acquiring characteristic information of an object in a first frame image, characteristic information of a background of the first frame image, and input characteristic information of a second frame image;
    detecting a blur region in the first frame image and in the second frame image;
    calculating an optical flow by calculating a motion vector of a pixel between the first frame image and the second frame image excluding the detected blur region;
    determining, based on the optical flow calculated between the object in the first frame image and the object in the second frame image, a plurality of feature points of the object in the first frame image;
    selecting two random feature points from among the plurality of feature points and determining two matching points of the object in the second frame image, wherein the matching points correspond to the feature points;
    calculating a length change ratio between the object in the first frame image and the object in the second frame image by using a distance between the selected two feature points and a distance between the two matching points; and
    calculating a change in a distance between a camera and the object from when the camera acquires the first frame image and when the camera acquires the second frame image by using the length change ratio;
    wherein the selecting the two random feature points and the calculating the length change ratio are repeated a plurality of times and a frequently obtained length change ratio is determined.

2. The method of claim 1, wherein the acquiring characteristic information of the object and the background includes:
    setting an object window based on the object in the first frame image; and calculating the characteristic information of the object and the background based on a position and a size of the set object window.

3. The method of claim 2, wherein the acquiring of the input characteristic information includes:
setting a search window in the second frame image based on the object window shown in the first frame image; and
acquiring input characteristic information of each pixel of the second frame image based on a position and a size of the set search window.

4. The method of claim 2, wherein the determining of the object in the second frame image includes setting an object window of the second frame image based on the position of the object window in the first frame image and the acquired characteristic information and input characteristic information.

5. The method of claim 1,
wherein the detecting a blur region comprises detecting the blur region in the first frame image and in the second frame image by using contrast and saturation of the first frame image and the second frame image.

6. The method of claim 1, wherein the determining of the feature point and the matching point includes:
determining a plurality of feature points in the first frame image based on texture elements of the first frame image;
selecting at least two points from among the determined plurality of feature points; and
determining at least two matching points corresponding to the at least two selected points based on the calculated optical flow.

7. An apparatus for measuring a distance change, the apparatus comprising:
a processor configured to:
acquire characteristic information of an object, characteristic information of a background of a first frame image, and input characteristic information of a second frame image;
detect a blur region in the first frame image and in the second frame image;
calculate an optical flow by calculating a motion vector of a pixel between the first frame image and the second frame image excluding the detected blur region;
determine the object in the second frame image based on the acquired characteristic information and input characteristic information;
determine, based on the optical flow calculated between the object in the first frame image and the object in the second frame image, a plurality of feature points of the object in the first frame image;
selecting two random feature points from among the plurality of feature points and determine two matching points corresponding to the selected two feature points of the object in the second frame image based on the calculated optical flow;
calculate a length change ratio between the object in the first frame image and the object in the second frame image by using a distance between the selected two feature points and a distance between the two matching points; and
calculate a change in a distance between a camera and the object from when the camera acquires the first frame image and when the camera acquires the second frame image by using the length change ratio;
wherein the selecting the two random feature points and the calculating the length change ratio are repeated a plurality of times and a frequently obtained length change ratio is determined.

8. The apparatus of claim 7, wherein the processor is further configured to set an object window based on the object in the first frame image, and calculates the characteristic information of the object and the background of the first frame image based on a position and a size of the set object window.

9. The apparatus of claim 8, wherein the processor is further configured to set a search window in the second frame image based on the object window shown in the first frame image, and acquires input characteristic information of each pixel of the second frame image based on a position and a size of the set search window.

10. The apparatus of claim 8, wherein the processor is further configured to set an object window of the second frame image based on the position of the object window in the first frame image and the acquired characteristic information and input characteristic information.

11. The apparatus of claim 7, wherein the processor is further configured to detect the blur region in the first frame image and the second frame image by using contrast and saturation of the first frame image and the second frame image, and calculates a motion vector of a pixel between the first frame image and the second frame image excluding the detected blur region.

12. The apparatus of claim 7, wherein
the processor is further configured to determine a plurality of feature points in the first frame image based on texture elements of the first frame image, and selects at least two points from among the determined plurality of feature points, and
determine at least two matching points corresponding to the at least two points selected by the feature point determination unit in the second frame image based on the calculated optical flow.

13. A processor that executes instructions of a computer program to perform a distance change measuring method comprising:
acquiring characteristic information of an object and a background of a first frame image, and input characteristic information of a second frame image;
determining an object in the second frame image based on the acquired characteristic information and input characteristic information;
detecting a blur region in the first frame image and in the second frame image;
calculating an optical flow by calculating a motion vector of a pixel between the first frame image and the second frame image excluding the detected blur region;
determining, based on the optical flow calculated between the object in the first frame image and the object in the second frame image, a plurality of feature points of the object in the first frame image;
selecting two random feature points from among the plurality of feature points and determining two matching points of the object in the second frame image, wherein the matching points correspond to the feature points;
calculating a length change ratio between the object in the first frame image and the object in the second frame image by using a distance between the selected two feature points and a distance between the two matching points; and
calculating a change in a distance between a camera and the object from when the camera acquires the first frame image and when the camera acquires the second frame image by using the length change ratio;

wherein the selecting the two random feature points and the calculating the length change ratio are repeated a plurality of times and a frequently obtained length change ratio is determined.

14. The processor of claim 13, wherein the acquiring of the object and the background of the first frame image includes:

setting an object window based on the object in the first frame image; and calculating the characteristic information of the object and the background of the first frame image based on a position and a size of the set object window.

15. The processor of claim 14, wherein the acquiring of the input characteristic information of the second frame image includes:

setting a search window in the second frame image based on the object window shown in the first frame image; and acquiring input characteristic information of each pixel of the second frame image based on a position and a size of the set search window.

16. The processor of claim 14, wherein the determining of the object in the second frame image includes setting an object window of the second frame image based on the position of the object window in the first frame image and the acquired characteristic information and input characteristic information.

17. The processor of claim 13, wherein the method further comprises calculating the optical flow by:

detecting a blur region in the first frame image and the second frame image by using contrast and saturation of the first frame image and the second frame image; and calculating a motion vector of a pixel between the first frame image and the second frame image excluding the detected blur region.

18. The processor of claim 13, wherein the determining of the feature point and the matching point includes:

determining a plurality of feature points in the first frame image based on texture elements of the first frame image;

selecting at least two points from among the determined plurality of feature points; and determining at least two matching points corresponding to the at least two selected points in the second frame image based on the calculated optical flow.

* * * * *